(12) United States Patent
Wright et al.

(10) Patent No.: US 9,273,663 B2
(45) Date of Patent: Mar. 1, 2016

(54) SUBSEA POWER SOURCE, METHODS, AND SYSTEMS

(75) Inventors: David Wright, Spring, TX (US); Fernando Hernandez, Houston, TX (US)

(73) Assignee: WRIGHT'S WELL CONTROL SERVICES, LLC, Humble, TX (US)

( * ) Notice: Subject to any disclaimer, the term of this patent is extended or adjusted under 35 U.S.C. 154(b) by 940 days.

(21) Appl. No.: 13/374,910

(22) Filed: Jan. 23, 2012

(65) Prior Publication Data

US 2013/0186637 A1 Jul. 25, 2013

(51) Int. Cl.
*E21B 33/064* (2006.01)
*F03B 13/18* (2006.01)
*F03B 13/00* (2006.01)
*E21B 41/04* (2006.01)

(52) U.S. Cl.
CPC ............. *F03B 13/1855* (2013.01); *E21B 41/04* (2013.01); *F03B 13/00* (2013.01); *F05B 2220/7066* (2013.01); *F05B 2220/7068* (2013.01); *F05B 2240/97* (2013.01); *Y02E 10/38* (2013.01)

(58) Field of Classification Search
USPC .................. 166/363, 338, 351, 344, 345, 339
See application file for complete search history.

(56) References Cited

U.S. PATENT DOCUMENTS

| | | | | |
|---|---|---|---|---|
| 2,979,799 A | * | 4/1961 | Decker | B30B 11/16 222/199 |
| 4,770,389 A | * | 9/1988 | Bodine | E21B 34/04 251/129.04 |
| 4,927,334 A | * | 5/1990 | Engdahl | F04B 17/042 310/26 |
| 6,360,536 B1 | * | 3/2002 | Prabhu | F15B 3/00 60/419 |
| 6,998,724 B2 | | 2/2006 | Johansen et al. | |
| 7,222,674 B2 | * | 5/2007 | Reynolds | E21B 33/035 166/341 |
| 7,242,118 B2 | * | 7/2007 | Sakamoto | H02K 41/03 310/15 |
| 8,286,935 B2 | * | 10/2012 | White | E21B 34/04 251/129.01 |
| 2002/0154572 A1 | * | 10/2002 | Mackenzie | E21B 33/0355 367/83 |
| 2005/0179263 A1 | * | 8/2005 | Johansen | E21B 33/0355 290/1 R |
| 2007/0000667 A1 | | 1/2007 | Mackenzie et al. | |
| 2009/0232664 A1 | * | 9/2009 | Qu | H02K 5/1285 417/44.1 |
| 2009/0293957 A1 | * | 12/2009 | White | E21B 34/04 137/1 |
| 2010/0123313 A1 | * | 5/2010 | Hobdy | F03B 13/20 290/42 |
| 2010/0187835 A1 | * | 7/2010 | Hohlfeld | B81B 3/0021 290/1 R |

* cited by examiner

*Primary Examiner* — Matthew R Buck
*Assistant Examiner* — Edwin Toledo-Duran

(57) ABSTRACT

Subsea power sources and related systems include a housing having at least one first magnetic member, an internal member having at least one second magnetic member, and at least one elastic member positioned in the housing. Movement of the one or more second magnetic members relative to the one or more first magnetic members, which can be obtained by positioning the power source in a subsea environment such that forces therein contact and move the housing or internal member, produces an electromagnetic output for powering a subsea object. Contact between the internal member and one or more elastic members causes the one or more elastic members to impart a force to the internal member to facilitate continued movement and power generation. Power generated in this manner or through other means is usable to operate a subsea kill plant, usable to kill a well or operate a subsea blowout preventer.

22 Claims, 4 Drawing Sheets

SUBSEA POWER SOURCE, METHODS, AND SYSTEMS

FIELD

Embodiments usable within the scope of the present disclosure relate, generally, to power sources, usable within a subsea environment, to provide power (e.g., via a mechanical or electromagnetic output) to one or more pieces of subsea equipment. Specific applications relate to a subsea system for killing a well that can include use of a subsea power source to maintain continuous capability for actuation of one or more blowout preventers, accumulators, or similar pieces of equipment to close and/or provide kill weight fluid to a well.

BRIEF DESCRIPTION OF THE DRAWINGS

In the detailed description of various embodiments usable within the scope of the present disclosure, presented below, reference is made to the accompanying drawings, in which.

Figure 1:
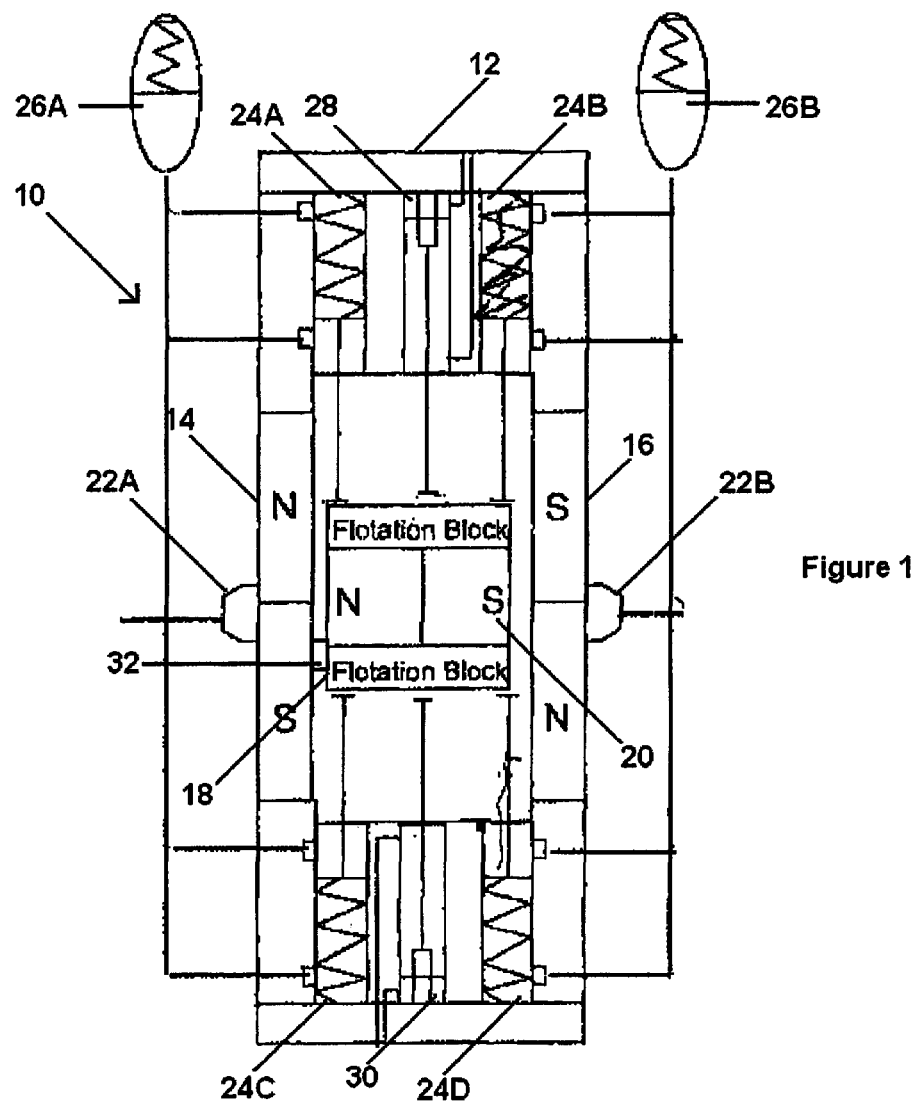
FIG. 1 depicts a diagrammatic view of an embodiment of a subsea power source usable within the scope of the present disclosure.

One or more embodiments are described below with reference to the listed Figures.

DETAILED DESCRIPTION OF THE EMBODIMENTS

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views as desired for easier and quicker understanding or explanation. As well, the relative size and arrangement of the components may differ from that shown and still operate within the spirit of the invention.

Moreover, it will be understood that various directions such as "upper," "lower," "bottom," "top," "left," "right," and so forth are made only with respect to explanation in conjunction with the drawings, and that the components may be oriented differently, for instance, during transportation and manufacturing as well as operation. Because many varying and different embodiments may be made within the scope of the concepts herein taught, and because many modifications may be made in the embodiments described herein, it is to be understood that the details herein are to be interpreted as illustrative and non-limiting.

Conventional operation of subsea equipment, such as blowout preventers, motors, and pumps, is typically problematic due to the difficulties inherent in ensuring a constant supply of power to such equipment. It is common to use umbilicals or similar conduits to connect subsea equipment to a surface power source; however, umbilicals can be time consuming and costly to connect, and are subject to damage and/or disconnection caused by currents, heave, and wave motion, especially during inclement weather. Remotely operated vehicles (ROV) can be used to connect umbilicals, though it is also possible to use ROVs to directly power a subsea device, such as through use of a battery or similar internal power source. ROVs, however, are limited in the amount of power that can be provided. Subsea equipment can also be powered through use of a stored power source, such as a subsea battery; however, long-term maintenance of a subsea battery can be unreliable due to the fact that subsea batteries can lose their charge over time, requiring frequent recharging operations when it is necessary to continuously maintain the ability to actuate one or more pieces of subsea equipment.

This, a need exists for subsea power sources usable to produce power in situ (e.g., in a subsea environment) for powering subsea equipment without requiring use of umbilicals, ROVs, or similar equipment.

As such, embodiments usable within the scope of the present disclosure relate to power sources usable to produce power within a subsea environment, which can be used to power subsea equipment and/or charge a subsea battery. Embodiments described herein also relate to subsea systems, such as kill plants, blowout preventers, and/or similar well containment and/or termination systems, contained and operable within a subsea environment.

FIG. 1 depicts a diagrammatic view of an embodiment of a subsea power source (10) usable within the scope of the present disclosure. The subsea power source (10) can be placed in a subsea environment (e.g., on the ocean floor and/or in a skid or similar containment apparatus) and used to generate power, in situ, for actuating one or more pieces of subsea equipment, such as blowout preventers, subsea motors, subsea pumps, subsea accumulators, and similar components, and/or for charging one or more subsea batteries.

The subsea power source (10) is shown having a first member, e.g., a housing (12), with a first magnet (14) positioned in a first side thereof and a second magnet (16) positioned in a second side thereof. While FIG. 1 shows the housing (12) as a generally rectangular member, it should be understood that the housing (12) can have any shape and/or dimensions depending on the characteristics of the subsea environment and/or the components to be powered by the subsea power source (10). Additionally, while FIG. 1 shows the housing (12) having two magnets (14, 16) in opposing sides thereof, the magnets (14, 16) being disposed in an opposing orientation relative to one another (e.g., each magnet (14, 16) oriented such that opposing poles thereof are disposed directly opposite one another), it should be understood that any number of magnets having any placement and orientation can be used.

A second member, e.g., an internal member (18), shown as a flotation block, is depicted within the housing (12), the internal member (18) having a magnet (20) positioned therein. FIG. 1 depicts an embodiment of a subsea power source (10) in which the internal member (18) is movable within the housing (12). For example, during operation, a subsea current and/or similar wave and/or water motion can impart a force to the internal member (18), causing upward or downward movement thereof within the housing (12). Similarly, force between the magnets (14, 16) within the housing (12) and the magnet (20) within the internal member (18) can impart a force to the internal member (18), causing movement thereof. For example, an electrical source, such as a subsea battery, a connection to a surface power source, a remotely operated vehicle, or output from the subsea power source (10), itself, can be used to actuate one or more of the magnets (14, 16, 20) to produce a magnetic field and cause a force therebetween, thereby imparting a force and causing movement of the internal member (18). Other mechanical components (e.g., springs or similar elastic members) within the housing (12) can also impart a force to the internal member (18).

Figure 2A:
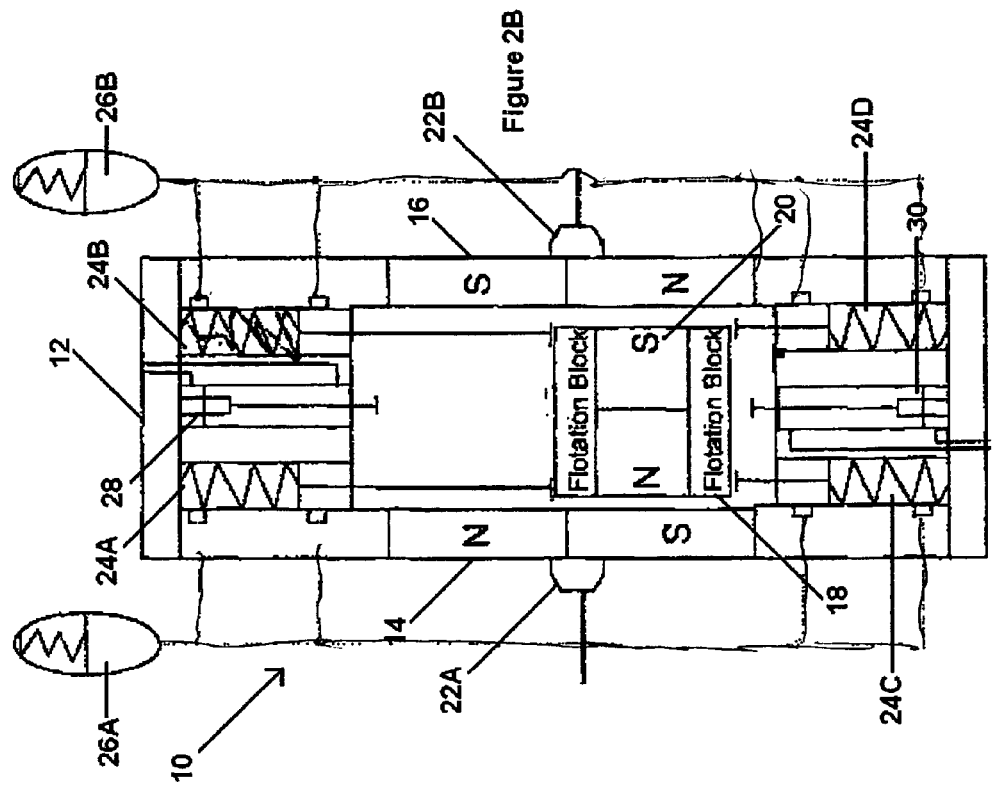
FIG. 2A depicts a diagrammatic view of the subsea power source of FIG. 1 having a movable member in an upper position.

While it should be understood that the shape, orientation, configuration, and direction in which the internal member (18) moves can vary, FIG. 2A depicts the embodiment of the subsea power source (10) shown in FIG. 1, in which the internal member (18) has been moved (e.g., through a force imparted by the subsea environment) to a raised position within the housing (12). Similarly, FIG. 2B depicts the subsea power source (10) of FIGS. 1 and 2A in which the internal member (18) has been moved to a lower position relative to the housing (12).

Figure 2B:
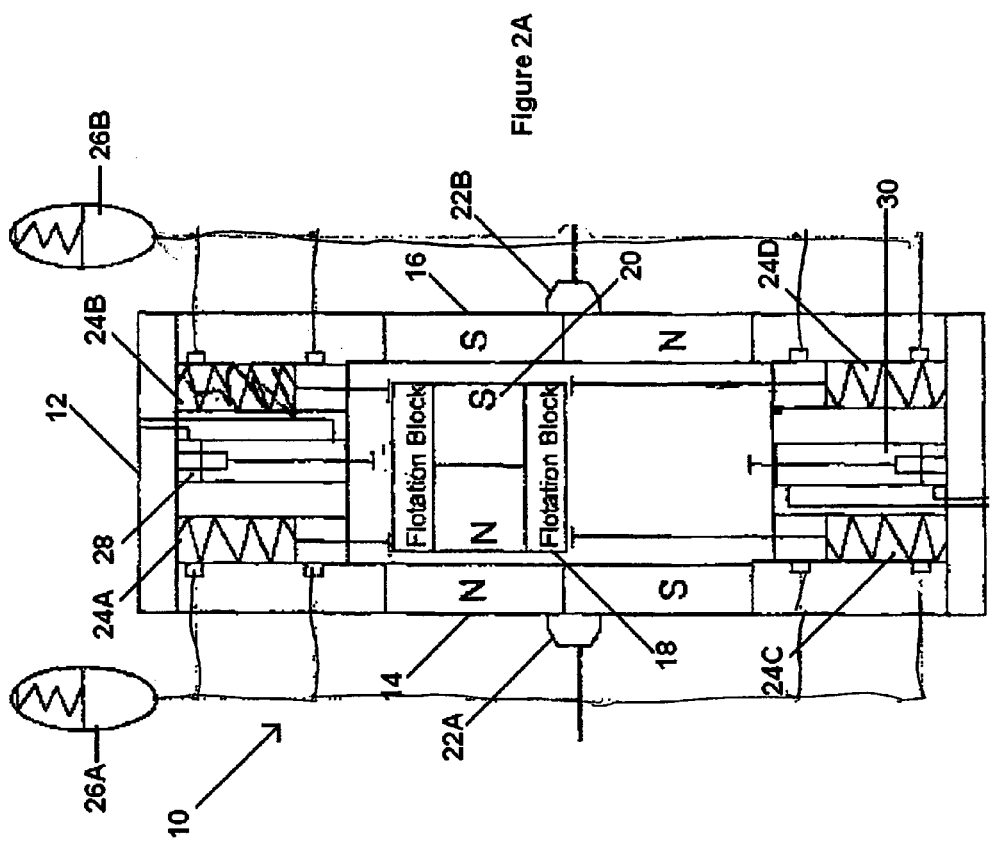
FIG. 2B depicts a diagrammatic view of the subsea power source of FIGS. 1 and 2A having the movable member in a lower position.

It should be understood that while FIG. 2A depicts the internal member (18) in a particular raised position within the housing (12), and FIG. 2B depicts the internal member (18) in a particular lower position within the housing (12), the specific range of motion provided to the internal member (18) can vary depending on the forces provided by the subsea environment, the magnets (14, 16, 20), or other mechanical and/or elastic members within the housing (12). It should further be understood that while FIGS. 1, 2A, and 2B depict an embodiment of a subsea power source (10) in which the internal member (18) is movable within the housing (12), in other embodiments, the housing (12) can be movable relative to the internal member (18), or both the housing (12) and the internal member (18) can be movable. Additionally, depiction of a housing (12) having an internal member (18) therein is merely exemplary; any configuration that includes at least one member movable relative to at least one other member can be used without departing from the scope of the present disclosure.

Movement of the internal member (18) relative to the housing (12) causes movement of the magnet (20) within the internal member (18) relative to the magnets (14, 16) within the housing (12), thereby producing an electromagnetic output, which can be communicated to a subsea object (e.g., a pump, motor, battery, accumulator, blowout preventer, or similar object) for actuating and/or charging the object. Any manner of circuitry, known in the art, can be used to convert the output from the subsea power source (10) to a form usable by the subsea object. For example, FIG. 1 depicts connections (22A, 22B) on the housing (12) which can be used to connect conduits between the subsea power source (10) and one or more subsea objects. In an embodiment, the connections (22A, 22B) can include hot swappable connections, such that multiple subsea power sources can be connected, as needed, in series or parallel, and/or used as backup and/or redundant power sources should one or more components malfunction or become worn.

FIG. 1 further depicts the subsea power source (10) having elastic members (24A, 24B, 24C, 24D), shown as spring cylinders, disposed within the housing (12). Specifically, two elastic members (24A, 24B) are shown positioned at a first end of the housing (12), while two additional elastic members (24C, 24D) are shown at a second end thereof. Spring cylinders, as known in the art, can include a cylindrical, or otherwise-shaped, body from which a piston, rod, or similar protruding member extends. Fluid and/or mechanical coils, or similar components within the cylinder body, can resist compression of the piston or rod, and bias the piston or rod outward from the body.

Two fluid sources (26A, 26B) (e.g., cylinders, bladders, or similar vessels) are shown in communication with each of the elastic members (24A, 24B, 24C, 24D). Specifically, a first fluid source (26A) is shown in communication with the first and third elastic members (24A, 24C), while a second fluid source (26B) is shown in communication with the second and fourth elastic members (24B, 24D); however, it should be readily understood that any number of fluid sources can be provided into communication with any number of elastic members. The fluid sources (26A, 26B) prevent exposure of each elastic member (24A, 24B, 24C, 24D) to the subsea environment by providing a sealed and/or closed environment thereto. In use, compression of the elastic members (24A, 24B, 24C, 24D) can cause fluid to flow from the elastic members (24A, 24B, 24C, 24D) into the fluid sources (26A, 26B). Similarly, expansion of the elastic members (24A, 24B, 24C, 24D), can cause fluid from the fluid sources (26A, 26B) to flow into the elastic members (24A, 24B, 24C, 24D). In an embodiment, the fluid sources (26A, 26B) can include compensation cylinders, or similar apparatus, configured to impart a force to the internal member (18) by flowing fluid into or from the elastic members (24A, 24B, 24C, 24D) for the purpose of extending or retracting the elastic members (24A, 24B, 24C, 24D) to contact and bias the internal member (18). For example, in an embodiment, the fluid sources (26A, 26B) can include heave compensation cylinders, such as those described in U.S. patent application Ser. No. 13/135,017, filed Jun. 23, 2011, the entirety of which is incorporated herein by reference.

In use, as the internal member (18) moves within the housing (12) (e.g., due to a force imparted by the subsea environment (e.g., wave motion, current, or similar movement of seawater), by the magnets (14, 16, 20), or by any of the elastic members (24A, 24B, 24C, 24D)), the internal member (18) will contact and compress one or more of the elastic members (24A, 24B, 24C, 24D). For example, as shown in FIG. 2A, upward movement of the internal member (18) within the housing (12) compresses the first and second elastic members (24A, 24B), while the third and fourth elastic members (24C, 24D) are permitted to expand. Similarly, as shown in FIG. 2B, downward movement of the internal member (18) within the housing (12) compresses the third and fourth elastic members (24C, 24D), while the first and second elastic members (24A, 24B) are permitted to expand. As such, when the internal member (18) is in the raised position, shown in FIG. 2A, the first and second elastic members (24A, 24B) are biased toward urging the internal member (18) in a downward direction, thus imparting a force thereto. Similarly, when the internal member (18) is in the lowered position, shown in FIG. 2B, the third and fourth elastic members (24C, 24D) urge the internal member (18) in an upward direction, imparting a force thereto. The elastic members (24A, 24B, 24C, 24D) thus facilitate continued movement of the internal member (18), in combination with force from the subsea environment and/or force imparted due to interactions between the magnets (14, 16, 20).

As described previously, while FIGS. 2A and 2B depict an exemplary range of motion of the internal member (18) within the housing (12), it should be understood that the internal member (18) can move any distance, ranging from a very small movement to a larger movement that spans the entire length of the housing (12), depending on the forces imparted thereto by the subsea environment, the magnets (14, 16, 20), one or more of the elastic members (24A, 24B, 24C, 24D), and any counter-forces imparted by others of the elastic members (24A, 24B, 24C, 24D) that would resist and/or counter these forces.

The subsea power source (10) of FIGS. 1, 2A, and 2B, is further shown including locking members (28, 30) at each end of the housing (12), usable to retain the internal member (18) in a fixed position relative to the housing (12), and/or to otherwise limit the range of motion of the internal member (18) within the housing (12). The locking members (28, 30) are shown as cylinders (e.g., hydraulic, pneumatic, or similar fluid-driven cylinders, mechanical and/or motorized and/or electrical cylinders, or other similar apparatus) having a piston, rod, or similar protruding member extendable therefrom to contact the internal member (18). Actuation of one or both locking members (28, 30) to contact the internal member (18) can retain the internal member (18) in a generally stationary position relative to the housing (12), which can limit or prevent wear on the components of the subsea power source (10) when operation thereof is not required, such as when a subsea battery or similar object attached thereto does not require power.

FIG. 1 depicts the locking members (28, 30) in an extended position to contact the internal member (18), thereby securing the internal member (18) in a fixed position within the housing (12) (e.g., at the approximate center thereof). FIGS. 2A and 2B depict the locking members (28, 30) in a retracted position, such that the internal member (18) can freely move within the housing (12), e.g., when contacted by a force imparted by the subsea environment. It should be understood that while FIGS. 1, 2A, and 2B depict an embodiment having two locking members (28, 30) positioned at opposing ends of the housing (12), other embodiments can use a single locking member usable to secure a portion of the subsea power source (10) relative to another portion by restricting the range of motion thereof and/or retaining a portion of the subsea power source (10) against and/or in contact with another portion thereof. In further embodiments, use of locking members can be omitted.

In an embodiment, illustrated in FIG. 1, the subsea power source (10) can include a mechanical converter (32), which can include any manner of mechanical engagement between two or more portions of the subsea power source (10), such that relative movement therebetween generates mechanical energy that can be used to power one or more subsea objects in communication with the subsea power source (10). For example, a protrusion extending from the internal member (18) can engage a slot, a geared arrangement, a motor, or similar mechanism disposed in the housing (12), such that movement of the internal member (18) generates mechanical energy that can be communicated to the connections (22A, 22B).

Figure 3:
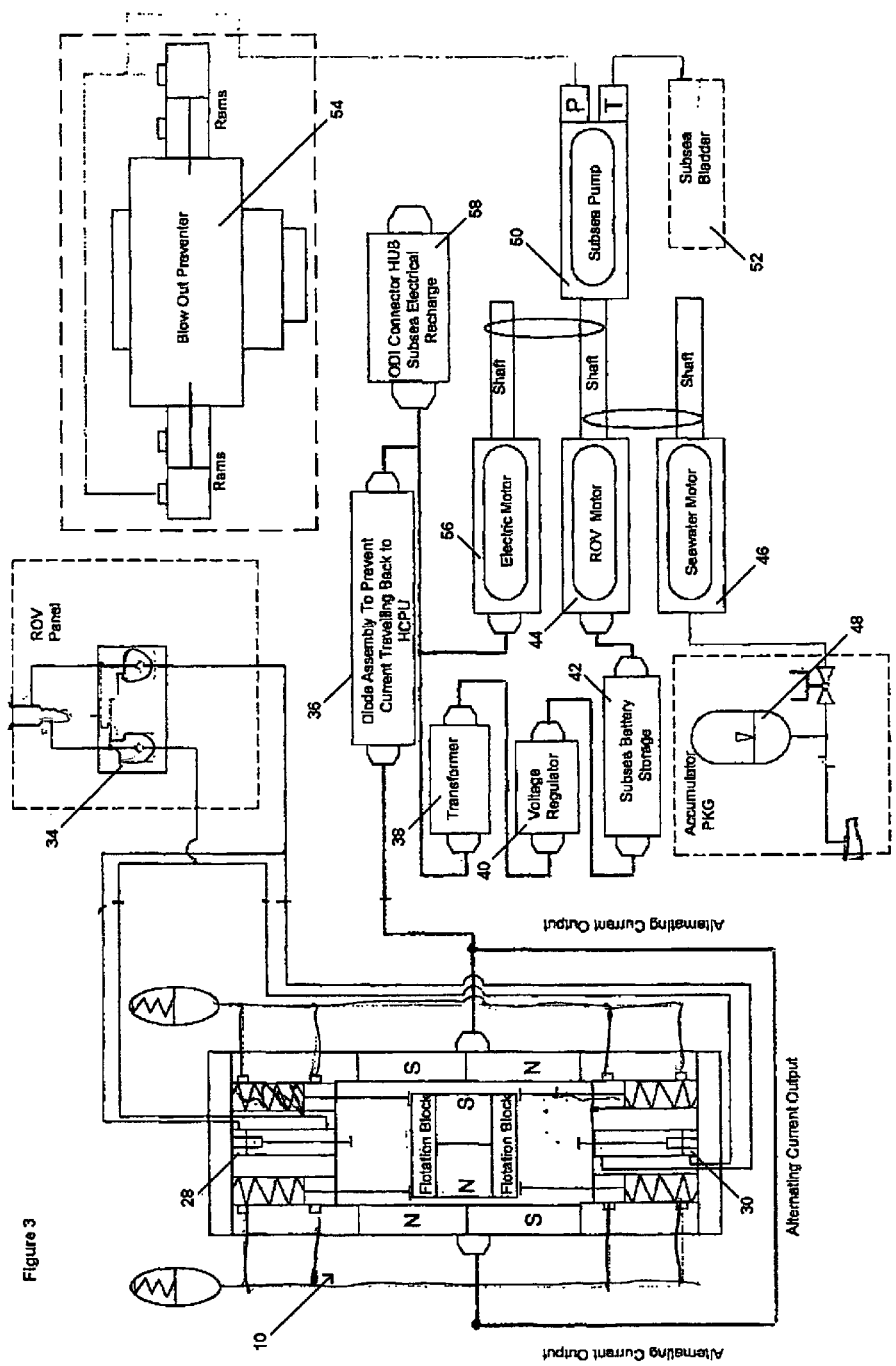
FIG. 3 depicts a diagrammatic view of an embodiment of a subsea power system usable within the scope of the present disclosure.

Referring now to FIG. 3, a diagrammatic view of an embodiment of a system for killing and/or closing a subsea well is shown. The system includes a power source (10), which is shown as a subsea power source having a configuration similar to that depicted in FIGS. 1, 2A, and 2B. However, it should be understood that while the depicted embodiment includes a particular subsea power source, other systems usable within the scope of the present disclosure can be powered using one or more subsea batteries, one or more connections to a surface power source, one or more remotely operated vehicles, other similar power sources, or combinations thereof.

FIG. 3 depicts a control device (34), which can include, for example, a ROV panel or similar apparatus, engaged with the locking members (28, 30), such that the control device (34) can be used to selectively actuate the depicted power source (10) (e.g., by permitting movement of the internal member within the housing, responsive to subsea forces, to generate an electromagnetic output). The control device (34) can be disposed in a subsea environment proximate to the power source (10) and actuated remotely, or in an embodiment, the control device (34) can be disposed at the surface, or at another location, and used to remotely actuate the power source (10).

Output (e.g., alternating current output) from the power source (10) can first be conveyed to a diode assembly (36) to prevent current from traveling backward through the depicted electrical conduits, toward the power source (10). Current that passes through the diode assembly (36) can flow through a transformer (38) and voltage regulator (40), to a subsea storage battery (42), where the power can be stored (e.g., used to recharge the battery). The subsea storage battery (42) and/or power from the power source (10) that passes through the subsea storage battery (42) can be used to actuate an ROV motor (44) or similar device.

FIG. 3 depicts the shaft of the ROV motor (44) engaged with the shaft of a seawater motor (46) or similar apparatus, such that actuation of the ROV motor (44) can be used to actuate the seawater motor (46), which can in turn be used to charge (e.g., fill and/or pressurize) an accumulator (48), and/or or flow fluid from the accumulator (48) to a well, such as when it is necessary to kill the well. As such, the depicted embodiment shows a subsea system usable to kill a well, that maintains the continuous ability to provide a kill-weight fluid thereto, when needed, by ensuring a supply of power and fluid is readily available.

In an embodiment, the ROV motor (44) or similar device can be used to drive a subsea pump (50), in communication with a subsea bladder (52) or similar fluid source. The subsea pump (50) can be used to operate (e.g., close) the rams of a subsea blowout preventer (54), and/or to provide fluid from the accumulator (48) into a well associated therewith.

When it is desirable for output from the power source (10) to bypass the subsea storage battery (42), the output can be provided to an electric motor (56), which is shown having a shaft engaged with that of the ROV motor (44). As such, the electric motor (56) can be used to actuate the subsea pump (50) via the ROV motor (44) and/or to actuate the seawater motor (46) via the ROV motor (44) to operate the accumulator (48).

FIG. 3 depicts an ODI connector hub (58) used to monitor current and the state of the subsea storage battery (42) and/or other system components, such that output from the power source (10) can be selectively directed to the subsea storage battery (42) or the electric motor (56), and when indicated, the control device (34) can be used to actuate the locking members (28, 30) and/or otherwise prevent or cause use of the power source (10).

Figure 4:
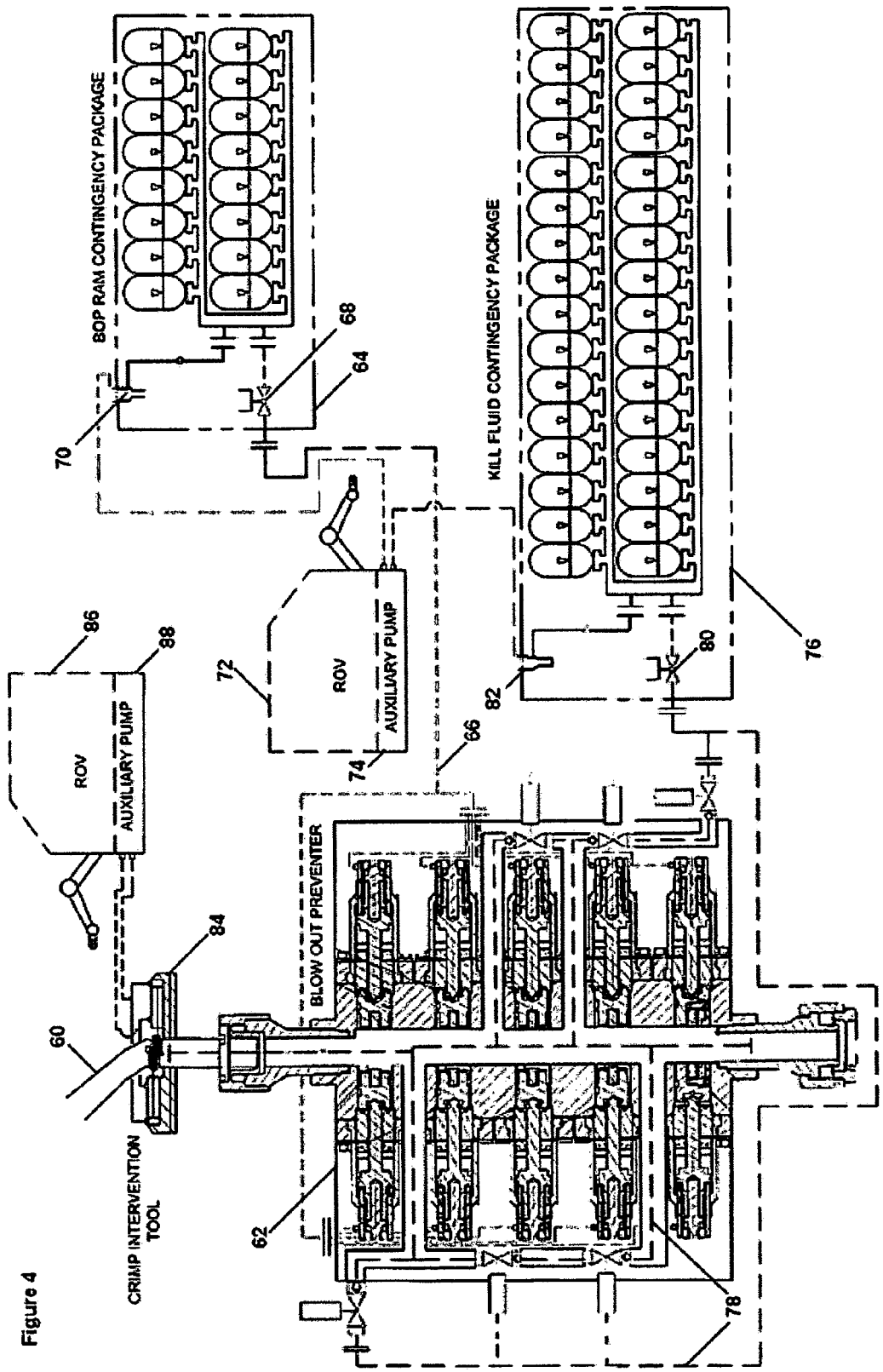
FIG. 4 depicts a diagrammatic view of an embodiment of a subsea kill plant usable within the scope of the present disclosure.

Referring now to FIG. 4, an embodiment of a subsea kill plant usable within the scope of the present disclosure is shown. Specifically, FIG. 4 shows a well having a conduit (60) (e.g., a riser) and a blowout preventer (62) in association therewith. While FIG. 4 depicts a blowout preventer (62) having five sets of rams, it should be understood that the depicted embodiment is solely exemplary, and that any manner of blowout preventer and/or other similar apparatus for closing a well can be used without departing from the scope of the present disclosure.

A first bank of accumulators (64) is shown disposed on the subsea floor proximate to and in communication with the rams of the blowout preventer (62), illustrated through the fluid path (66) indicated by a dashed line. When it is desired to actuate the blowout preventer (62), one or more valves (68), pumps, motors, and/or other means can be actuated to flow fluid from the first bank of accumulators (64) to the blowout preventer (62) to cause actuation thereof to close and/or seal the well. The first bank of accumulators (64) is shown having an access point (70), which can be engaged by a remotely operated vehicle (72) having an auxiliary pump (74), a subsea power source (e.g., a battery and/or a subsea power source of the type depicted and described in FIG. 1), a surface or subsea conduit (e.g., an umbilical), or other similar objects for providing power and/or fluid to the first bank of accumulators (64) to ensure the continuous ability of the subsea kill plant to actuate the blowout preventer (62).

A second bank of accumulators (76) is shown disposed on the subsea floor proximate to and in communication with the well, illustrated through the fluid path (78) indicated by a dashed line. When it is desirable and/or necessary to kill the well, one or more valves (80), pumps, motors, and/or other means can be actuated to flow a kill weight fluid from the second bank of accumulators (76) into the well. To prevent the kill weight fluid from flowing through the conduit (60) in an uphole direction, a crimping tool (84) can be used to crimp and/or otherwise close or seal the conduit (60), such that the kill weight fluid from the second bank of accumulators (76) will flow into the well. The crimping tool (84) can be actuated by a remotely operable vehicle (86) having an auxiliary pump (88), or by any other means known in the art (e.g., use of conduits, remote actuation, etc.). The second bank of accumulators (76) is shown having an access point (82), which can be engaged by a remotely operated vehicle (72) having an auxiliary pump (74), a subsea power source (e.g., a battery and/or a subsea power source of the type depicted and described in FIG. 1), a surface or subsea conduit (e.g., an umbilical), or other similar objects for providing power and/or fluid to the second bank of accumulators (76) to ensure the continuous ability of the subsea kill plant to kill the well if needed.

As such, embodiments described herein can include subsea systems, for killing and/or closing wells, and/or for other purposes, in which a subsea power source, or an alternate power source, can be used to actuate and/or charge a variety of subsea equipment, such as motors, pumps, accumulators, batteries, and/or blowout preventers.

Embodiments of the present disclosure thereby provide power sources, methods, and systems that overcome the drawbacks of conventional surface connections, batteries, and remotely operated vehicles, while providing for the continuous availability of power, generated in situ in a subsea environment. Thus, embodiments described herein also provide for various systems, such as those used to kill a well, that are continuously available for operation due to the availability of power and/or kill weight fluid, as needed.

While various embodiments usable within the scope of the present disclosure have been described with emphasis, it should be understood that within the scope of the appended claims, the present invention can be practiced other than as specifically described herein.

What is claimed is:

1. A system for killing a subsea well, the system comprising:
a subsea power source operable for producing an electrical output, the subsea power source comprising
a housing comprising at least one first magnetic member;
an internal member comprising at least one second magnetic member; and
at least one elastic member positioned at an end of the housing,
wherein at least one of the housing and the internal member is movable relative to the other of the housing and the internal member, wherein relative movement between the at least one first magnetic member and the at least one second magnetic member produces an electromagnetic output, wherein the internal member, the housing, or combinations thereof, is in fluid communication with a subsea environment, wherein movement of fluid within the subsea environment imparts a force to the at least one of the housing and the internal member thereby causing movement of the at least one of the housing and the internal member relative to the other of the housing and the internal member, and wherein contact between the internal member and the at least one elastic member causes the at least one elastic member to impart a force to the internal member thereby causing movement of the at least one of the housing and the internal member relative to the other of the housing and the internal member;
at least one subsea motor in communication with the subsea power source for receiving power therefrom;
at least one subsea pump in communication with the at least one subsea motor;
a subsea accumulator in communication with the at least one subsea motor, the at least one subsea pump, or combinations thereof; and
a blowout preventer in communication with the at least one subsea motor, the at least one subsea pump, or combinations thereof,
wherein the electromagnetic output from the subsea power source provides the blowout preventer with a continuous ability to close to prevent flow of fluid from the subsea well, and wherein the electromagnetic output from the subsea power source provides the subsea accumulator with a continuous ability to provide a kill weight fluid into the subsea well to prevent flow of fluid therefrom.

2. The system of claim 1, wherein the housing comprises a left magnetic member in a first side thereof and a right magnetic member in a second side thereof, and wherein the left magnetic member is oriented such that magnetic poles thereof are positioned opposite opposing magnetic poles of the right magnetic member.

3. The system of claim 1, further comprising a fluid source in communication with the at least one elastic member.

4. The system of claim 3, wherein contact between the internal member and the at least one elastic member causes flow of fluid between the fluid source and the at least one elastic member, and wherein the flow of fluid affects the force imparted to the internal member by the at least one elastic member.

5. The system of claim 1, further comprising an electrical source in communication with the at least one first magnetic member, the at least one second magnetic member, or combinations thereof, wherein actuation of the electrical source controls a magnetic field of the at least one first magnetic member, the at least one second magnetic member, or combinations thereof to affect relative movement between the at least one first magnetic member and the at least one second magnetic member.

6. The system of claim 5, wherein the electrical source comprises the electromagnetic output.

7. The system of claim 5, wherein the electrical source comprises a conduit communicating between the power source and a surface environment, a subsea battery, a remotely operated vehicle, or combinations thereof.

8. The system of claim 1, further comprising at least one locking member in communication with the housing and the internal member for retaining the at least one of the housing and the internal member in a fixed position relative to the other of the housing and the internal member.

9. The system of claim 1, further comprising a mechanical converter engaged with the internal member, the housing, or combinations thereof, wherein movement of the at least one of the housing and the internal member is converted to an electrical output for powering the subsea object.

10. A subsea system for killing a well having a blowout preventer associated therewith, the system comprising:
    at least one first accumulator in communication with the blowout preventer, wherein the at least one first accumulator is disposed on a subsea floor;
    at least one second accumulator in communication with the well, wherein the at least one second accumulator is disposed on the subsea floor;
    at least one access point accessible to a remotely operated vehicle, the subsea power source, a surface conduit, a subsea conduit, or combinations thereof, wherein the at least one access point is in communication with the at least one first accumulator, the at least one second accumulator, or combinations thereof for providing power to the at least one first accumulator, the at least one second accumulator, or combinations thereof; and
    a subsea power source comprising a housing and an internal member, wherein the housing comprises at least one first magnetic member, wherein the internal member comprises at least one second magnetic member, wherein at least one of the housing and the internal member are movable relative to the other of the housing and the internal member, and wherein relative movement between the at least one first magnetic member and the at least one second magnetic member produces an electromagnetic output for powering the at least one first accumulator, the at least one second accumulator, the at least one access point, or combinations thereof.

11. The subsea system of claim 10, wherein the housing of the subsea power source additionally comprises a left magnetic member in a first side thereof and a right magnetic member in a second side thereof, and wherein the left magnetic member is oriented such that magnetic poles thereof are positioned opposite opposing magnetic poles of the right magnetic member.

12. The subsea system of claim 10, wherein the internal member is movable relative to the housing, wherein the internal member is in fluid communication with a subsea environment, and wherein movement of fluid within the subsea environment imparts a force to the internal member thereby causing movement of the internal member relative to the housing.

13. The subsea system of claim 10, wherein the housing further comprises at least one elastic member positioned at an end thereof, and wherein contact between the internal member and the at least one elastic member causes the at least one elastic member to impart a force to the internal member thereby causing movement of the at least one of the housing and the internal member relative to the other of the housing and the internal member.

14. The subsea system of claim 13, further comprising a fluid source in communication with the at least one elastic member.

15. The subsea system of claim 14, wherein contact between the internal member and the at least one elastic member causes flow of fluid between the fluid source and said at least one elastic member, and wherein the flow of fluid affects the force imparted to the internal member by the at least one elastic member.

16. The subsea system of claim 10, further comprising an electrical source in communication with the at least one first magnetic member, the at least one second magnetic member, or combinations thereof, wherein actuation of the electrical source controls a magnetic field of the at least one first magnetic member, the at least one second magnetic member, or combinations thereof to affect relative movement between the at least one first magnetic member and the at least one second magnetic member.

17. The subsea system power of claim 16, wherein the electrical source comprises the electromagnetic output.

18. The subsea system of claim 16, wherein the electrical source comprises a conduit communicating between the power source and a surface environment, a subsea battery, a remotely operated vehicle, or combinations thereof.

19. The subsea system of claim 10, further comprising a subsea blowout preventer, a subsea pump, a subsea battery, a subsea accumulator, a subsea motor, or combinations thereof in communication with the housing for receiving power from the electromagnetic output.

20. The subsea system of claim 10, further comprising at least one locking member in communication with the housing and the internal member for retaining the at least one of the housing and the internal member in a fixed position relative to the other of the housing and the internal member.

21. The subsea system claim 10, further comprising a mechanical converter engaged with the internal member, the housing, or combinations thereof, wherein movement of the at least one of the housing and the internal member is converted to an electrical output for powering the at least one first accumulator, the at least one second accumulator, the at least one access point, or combinations thereof.

22. The subsea system of claim 10, further comprising at least one crimping apparatus in association with a conduit in communication with the well, wherein the at least one crimping apparatus is operable to prevent flow of fluid from the at least one second accumulator in an uphole direction through the conduit in communication with the well.

* * * * *